(12) United States Patent
Torisu et al.

(10) Patent No.: US 6,609,540 B1
(45) Date of Patent: Aug. 26, 2003

(54) METHOD AND APPARATUS FOR SUPPLYING FLUORINE GAS

(75) Inventors: Junichi Torisu, Kanagawa (JP); Mituyoshi Yamazaki, Kanagawa (JP); Yasuyuki Hoshino, Kanagawa (JP); Yuji Sakai, Kanagawa (JP); Shunzou Nakagawa, Kanagawa (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/604,016

(22) Filed: Jun. 26, 2000

Related U.S. Application Data
(60) Provisional application No. 60/147,494, filed on Aug. 9, 1999.

(30) Foreign Application Priority Data

Jun. 24, 1999 (JP) ............................. 11-179025

(51) Int. Cl.$^7$ ........................... H01S 3/00; H01S 3/041; F16K 49/00
(52) U.S. Cl. ........................... 137/896; 137/3; 137/338; 137/341; 372/57; 372/58; 372/59; 372/60
(58) Field of Search ................................ 137/341, 896, 137/3, 6, 338; 372/57, 59, 60, 58

(56) References Cited

U.S. PATENT DOCUMENTS

| | | | | |
|---|---|---|---|---|
| 4,958,356 A | * | 9/1990 | Tanuma | 372/57 |
| 5,005,181 A | | 4/1991 | Yoshioka et al. | |
| 5,022,039 A | * | 6/1991 | Karube et al. | 372/59 |
| 5,060,238 A | * | 10/1991 | Karube et al. | 372/58 |
| 5,090,020 A | | 2/1992 | Bedwell | |
| 5,117,435 A | * | 5/1992 | Cook, Jr. et al. | 372/59 |
| 5,199,267 A | | 4/1993 | Mitsui | |
| 5,220,574 A | | 6/1993 | Voss et al. | |
| 5,363,396 A | * | 11/1994 | Webb et al. | 372/57 |
| 5,377,215 A | * | 12/1994 | Das et al. | 372/57 |
| 5,396,514 A | | 3/1995 | Voss | |
| 5,978,406 A | * | 11/1999 | Rokni et al. | 372/58 |
| 6,028,880 A | * | 2/2000 | Carlesi et al. | 372/58 |
| 6,151,349 A | * | 11/2000 | Gong et al. | 372/58 |
| 6,151,350 A | * | 11/2000 | Komori et al. | 372/57 |

FOREIGN PATENT DOCUMENTS

| | | |
|---|---|---|
| JP | A-1-115182 | 5/1989 |
| JP | A-2-9185 | 1/1990 |
| JP | A-9-116214 | 5/1997 |

\* cited by examiner

*Primary Examiner*—George L. Walton
(74) *Attorney, Agent, or Firm*—Sughrue Mion, PLLC (57) ABSTRACT

A supplying method and a supplying apparatus for supplying fluorine gas, in which when a fluorine-occluding substance is used for the fluorine gas-generating means, a necessary amount of fluorine gas can be stably and swiftly supplied to have a uniform concentration to &a chamber of an excimer laser device or the like even at running, to say nothing of the gas exchange time. In a fluorine gas-generating means, fluorine gas is generated at the use point by controlling a fluorine-occluding substance to a predetermined temperature, the fluorine gas is introduced into a mixing container, a diluting gas is introduced into the mixing container to mix it with the fluorine gas to prepare a fluorine mixed gas having a predetermined pressure and a predetermined fluorine gas concentration, and the fluorine mixed gas reserved in the mixing container is supplied to a use side such as chamber, using the pressure difference.

29 Claims, 5 Drawing Sheets

METHOD AND APPARATUS FOR SUPPLYING FLUORINE GAS

CROSS REFERENCE TO RELATED APPLICATIONS

This application is an application filed under 35 U.S.C. §111(a) claiming benefit pursuant to 35 U.S.C. §119(e)(1) of the filing date of Provisional Application 60/147,494 filed Aug. 9, 1999 pursuant to 35 U.S.C. §111(b).

FIELD OF THE INVENTION

The present invention relates to a method and an apparatus for supplying fluorine gas, which are used in supplying fluorine gas to an excimer laser chamber (hereinafter simply referred to as a "chamber") of an excimer laser device or the like.

BACKGROUND OF THE INVENTION

With respect to techniques for supplying fluorine gas to the chamber of an excimer laser device, for example, JP-A-6-334241 (the term "JP-A" as used herein means an "unexamined published Japanese patent application") describes a technique of using an apparatus comprising a gas bomb filled with fluorine gas, a bomb filled with a rare gas such as krypton, and a bomb filled with a buffer gas such as neon or helium, where out of the gas components forming the excimer laser gas, the fluorine gas and the rare gas each accounting for a small constitutional ratio in terms of gas concentration are supplied through a sub-chamber and the buffer gas having a large constitutional ratio in terms of gas concentration is supplied directly to the chamber. However, in the case of supplying fluorine gas from a gas bomb, the bomb must be housed in a bomb box apart from the excimer laser device to ensure safety and handleability because the bomb contains fluorine gas at a high pressure and the bomb is large and heavy. This is disadvantageous in that the size of the apparatus as a whole becomes very large and fluorine gas filled in the bomb is deteriorated during the long-term storage to impair laser properties of the excimer laser.

On the other hand, for example, International Patent Application No. 5-502981 describes a fluorine gas-generating means using a fluorine-occluding substance such as fluoronickel material in which fluorine is occluded. The fluorine-occluding substance generates fluorine gas by heating and controlling it to a predetermined temperature. Even at a relatively low controlling temperature, the necessary amount of fluorine gas can be generated and at the same time, the generation pressure is low, so that easy handling and high safety can be attained. Furthermore, the generating means can be reduced in the size and since the equilibrated and non-gasified fluorine is in the occluded state, deterioration scarcely occurs even in the long-term storage. However, the pressure of fluorine gas generated using such a fluorine generating means is generally lower than the pressure in the chamber of an operating excimer laser device, therefore, even if fluorine gas is efficiently removed in a practical temperature range, the fluorine gas cannot be introduced directly into the chamber of an operating excimer laser device except for the case where the gas exchange is performed after gas in the chamber is evacuated. To solve this problem, some proposals have been made with an attempt to enable the supply of fluorine gas generated by such a fluorine gas-generating means using a fluorine-occluding substance even at the operating time, to say nothing of the gas exchange time.

Of these, the above-described International Patent Application No. 5-502981 proposes a technique of circulating gas in the chamber by a pump, disposing the above-described fluorine gas-generating means such that it is connectable to the circulation path, and supplying fluorine gas together with the circulating gas to the chamber. JP-A-9-116214 proposes a technique of connecting a bomb of buffer gas such as Ne to the above-described fluorine gas-generating means and supplying the fluorine gas generated under compression of the buffer gas into the chamber. However, generation of fluorine gas using the fluorine-occluding substance cannot be always controlled in a constant and simple manner depending to the temperature and the like. Therefore, the above-described method or apparatus where the fluorine gas-generating means is directly connected to the path for gas supplied to the chamber has difficulty in supplying in a stable manner the necessary amount of fluorine gas with good precision. Moreover, a portion having a high fluorine gas concentration is partially and temporarily generated in the gas supplied to the chamber because fluorine gas in 100% concentration is generated from the fluorine-occluding substance, and this may cause adverse effect such as fluctuation of the laser properties.

On the other hand, U.S. Pat. No. 5,396,514 proposes a technique of introducing fluorine gas generated in the above-described fluorine gas-generating means into a collecting receptacle and then connecting the collecting receptacle with the chamber to disperse the fluorine gas in the chamber, a technique of, similarly to the case in JP-A-9-116214 supra, connecting a rare gas bomb or the like to the collecting receptacle and simultaneously opening the valve between the rare gas bomb and the collecting receptacle and the valve between the collecting receptacle and the chamber to allow the rare gas or the like to compress the fluorine gas to flow out of the collecting receptacle into the chamber, or a technique of, similarly to the case of International Patent Application No. 5-502981 supra, circulating gas in the chamber and connecting the above-described collecting receptacle to the circulating path to thereby supply fluorine gas. However, in these methods or apparatuses, fluorine gas in 100% concentration or a gas unequal in fluorine gas concentration is still directly supplied to the chamber, therefore, the laser properties may fluctuate. This state that the laser properties are unstable disadvantageously continues for a long time particularly when fluorine gas is supplied by dispersion into the chamber, because it takes a long time for the fluorine gas to uniformly disperse in the chamber.

In the case of compressing fluorine gas in the fluorine gas-generating means or collecting receptacle by a buffer gas or rare gas to flow into the chamber, the fluorine gas concentration in the inflow gas is very difficult to always maintain at a predetermined concentration with good reproducibility. Therefore, the laser properties may fluctuate depending on supply of fluorine gas. In the case of circulating the gas in the chamber using a pump, compressor or circulating unit such as a blower and supplying fluorine gas to the circulation path, not only the problem of reproducibility or the like is present but also a problem arises that the fluorine gas supplying apparatus is inevitably complicated due to disposition of the circulating unit or a driving unit for driving it and the effect by using a fluorine-occluding substance in the fluorine gas-generating means is impaired.

On the other hand, in the method for supplying fluorine gas by using a sub-chamber described in JP-A-6-334241 or by using a collecting receptacle described in U.S. Pat. No. 5,396,514, the container is evacuated of residual gas whenever fluorine gas is supplied from the sub-chamber for the purpose of gas exchange in the chamber of an excimer laser device or addition of gas to the operating excimer laser device, and then receives fluorine gas from the fluorine gas-generating means in the container. This is disadvantageous not only due to the cumbersome operation but also in poor profitability, because the residual gas still contains fluorine gas in a certain concentration and also contains rare gas or buffer gas. Furthermore, in these methods or apparatuses for supplying fluorine gas, as a matter of course, fluorine gas cannot be introduced into the container while supplying fluorine gas from the container to the chamber. For example, if fluorine gas in the container runs short during the supply of fluorine gas to the chamber, the supply of fluorine gas must be once interrupted to again introduce fluorine gas into the container. Thus, the fluorine gas cannot be continuously supplied.

The present invention has been made under these circumstances.

SUMMARY OF THE INVENTION

A main object of the present invention is to provide a method and an apparatus for supplying fluorine gas when using the above-described fluorine-occluding substance for fluorine gas-generating means, in which a necessary amount of fluorine gas in uniform concentration can be stably and swiftly supplied to the chamber of an excimer laser device or the like even during the operating time as well as the gas exchange time.

Another object of the present invention is to attain the effective use of fluorine gas and rare gas and also enable a continuous supply of fluorine gas.

The above-described problems can be solved and the main object can be attained by a method for supplying fluorine gas of the present invention, comprising:

generating fluorine gas using a fluorine gas-generating means capable of controlling a fluorine-occluding substance to a predetermined temperature, introducing the fluorine gas into a mixing container, introducing a diluting gas into the mixing container to mix it with the fluorine gas and thereby prepare a fluorine-containing mixed gas (hereinafter simply referred to as "fluorine mixed gas") having a predetermined pressure and a predetermined fluorine gas concentration and reserve in the mixing container, supplying the fluorine mixed gas to a use point having a pressure lower than the pressure of the fluorine mixed gas.

The diluting gas used here is a single gas of $N_2$, He, Ar or Ne, a mixed gas of He and Ne (buffer gas), or a mixed gas obtained by adding a single gas of Ar or Kr or mixed gas of Ar and Kr (rare gas) to the single gas of He or Ne or mixed gas of He and Ne. In particular, for the KrF excimer laser, Ne or a mixed gas of Ne and Kr is used as the diluting gas. Therefore, according to the supplying method of the present invention, where the fluorine mixed gas is prepared by mixing a low-pressure fluorine gas generated from the fluorine-occluding substance with a high-pressure diluting gas in the mixing container, the above-described predetermined pressure of the fluorine mixed gas prepared can be set higher than the pressure in the destination of supply, such as a chamber, using the pressure of the diluting gas. In the case where the chamber is evacuated, as a matter of course, a necessary amount of fluorine mixed gas can be supplied by the pressure difference without using a circulating unit or the like even to the chamber of an operating excimer laser device.

On the other hand, in the present invention, the fluorine gas concentration in the fluorine mixed gas supplied is defined as the ratio of the total pressure of the fluorine mixed gas prepared to the partial pressure of fluorine gas introduced into the mixed container. Accordingly, for example, by introducing fluorine gas or diluting gas into the mixing container while controlling those pressures to lie in a predetermined ratio, a fluorine mixed gas can be prepared to have a fluorine gas concentration in good reproducibility and always kept essentially at a predetermined concentration. Furthermore, according to the present invention, fluorine gas in 100% concentration introduced from a fluorine gas-generating means is diluted with a diluting gas to prepare a fluorine mixed gas having a low fluorine gas concentration or the fluorine gas is uniformly dispersed because the fluorine mixed gas is reserved in the mixing container, therefore, the fluorine mixed gas can be prevented from generation of partially biased fluorine gas concentration. The influence or the like on the laser properties at the supply of fluorine mixed gas to the above-described chamber can be minimized and stable laser properties can be maintained.

In the present invention, at the preparation of a fluorine mixed gas in the above-described mixing container, if the fluorine mixed gas reserved in the mixing container is extremely reduced, for example, at the first time preparation of a fluorine mixed gas in the mixing container or after gas exchange of the above-described chamber or the like, the fluorine mixed gas may be prepared by evacuating the mixing container in advance, introducing fluorine gas and diluting gas thereinto and mixing them. In this case, a method in which after evacuation of the above-described mixing container in advance, first introducing a diluting gas to a predetermined partial pressure, then introducing fluorine gas and thereafter adding the diluting gas to prepare a fluorine mixed gas may also be used. The pressure in the evacuated mixing container here is of course preferably 0 MPa in theory, however, it is in fact preferably less than 0.01 MPa (absolute pressure, hereinafter the same). This is because if the pressure in the evacuated mixing container is 0.01 MPa or more, the influence of the fluorine mixed gas remaining in the mixing container on the preparation of next fluorine mixed gas in the mixing container cannot be neglected. Thus, the preparation must be performed by taking account of the residual fluorine mixed gas as described below.

That is, in the present invention, the fluorine mixed gas prepared is reserved in the mixing container and then supplied. Therefore, even if the fluorine mixed gas in the mixing container is reduced by the supply, a new fluorine mixed gas can be prepared in the. mixing container without evacuating the fluorine mixed gas in the mixing container but allowing it to remain. By doing so, the fluorine gas or buffer gas in the residual fluorine mixed gas can be effectively used without wasting them and profitability can be increased. In the case of preparing a new fluorine mixed gas while allowing the fluorine mixed gas to remain in the mixing container, the pressure of the residual fluorine mixed gas is, in contrast with the above, preferably 0.01 MPa or more, more preferably in view of profitability, an atmospheric pressure (0.1013 MPa) or more. Incidentally, as the pressure of the residual fluorine mixed gas is higher, a larger amount of fluorine mixed gas remains in the mixing container and this is more profitable, however, if it is excessively high, fluorine gas cannot be efficiently introduced from the fluorine gas-generating means at the preparation of a new fluorine mixed gas. At present, the upper limit is substantially on the order of from 0.2 to 0.3 MPa.

In either case where the mixing container is previously evacuated and then a new fluorine mixed gas is prepared as described above or where a new fluorine mixed gas is prepared while allowing the fluorine mixed gas to remain in the mixing container, the new fluorine mixed gas in the third or later preparation counted from the first preparation in the evacuated state may be prepared by introducing fluorine gas and diluting gas into the mixing container at the same partial pressures as in the preceding second time preparation, so that the new fluorine mixed gas prepared can have the same fluorine gas concentration and pressure (total pressure) as the fluorine mixed gas prepared the second time. However, in the case of preparing a new fluorine mixed gas while allowing a part of the previously prepared fluorine mixed gas to remain in the mixing container, when the preparation precedent to the preparation of a new fluorine mixed gas is the first time preparation performed in the state where the mixing container is evacuated, namely, when a new preparation in the presence of the residual fluorine mixed gas is performed for the first time at the second time preparation subsequent to the first time preparation, if fluorine gas is introduced at the same partial pressure as in the first time preparation and at the same time, a fluorine mixed gas having the same total pressure as in the first time preparation is prepared, the fluorine gas concentration differs between the newly prepared fluorine mixed gas and the precedently prepared fluorine mixed gas.

In such a case, for equalizing the fluorine gas concentration between the precedently prepared fluorine mixed gas and the newly prepared fluorine mixed gas, a method of setting the partial pressure of fluorine gas introduced at the preparation of a new fluorine mixed gas to be the same as the partial pressure of fluorine gas introduced into the above-described mixing container at the preparation of the precedent fluorine mixed gas, or a method of setting the total pressure of the precedently prepared fluorine mixed gas and the total pressure of the newly prepared fluorine mixed gas to the same constant value may be used. In the former method, the total pressure of the precedently (first time) prepared fluorine mixed gas and the newly (second time) prepared fluorine mixed gas may vary, however, the partial pressure of fluorine gas introduced into the mixing container needs not be changed and the operation of introducing fluorine gas from the fluorine gas-generating means can be facilitated. On the other hand, in the latter method, the partial pressure of fluorine gas introduced into the mixing container must be changed but by setting the total pressure of fluorine mixed gas prepared this time to be the same as before, the total pressure of fluorine mixed gas as a whole can be made constant in every preparation such that the operation of supplying to the use point can be facilitated.

The supplying method of the present invention may also be applied to the case where a diluted fluorine gas is required, for example, in the manufacturing process of semiconductors. However, on taking account of the above-described circumstances, the supplying method of the present invention is particularly suitably used for supplying the above-described fluorine mixed gas to a chamber of an excimer laser device. In this case, needless to the case of performing gas exchange after evacuating the above-described chamber, by setting the total pressure of fluorine mixed gas prepared in the above-described mixing container to be higher than the operating pressure in the chamber, the fluorine mixed gas can be supplied to the chamber using the pressure difference even when the excimer laser device is operating, and the operation of the excimer laser device can be continuously and stably maintained. In the case where the mixing container is provided with a holding container as described later, the pressures of the mixing container and the holding container are set to be higher than the pressure in the chamber.

In the supplying step of fluorine mixed gas to the chamber of an excimer laser device, the amount and pressure of fluorine mixed gas in the above-described mixing container are preferably adjusted such that they can respond to at least a single operation of gas adding step where fluorine mixed gas is supplied in the state that the chamber is at an operating pressure and at least one operation of gas exchange step where fluorine mixed gas is supplied after the chamber is evacuated, or can respond to two or more operations of gas addition. In other words, in the supplying method of the present invention, the amount and the pressure of fluorine mixed gas in the mixing container are preferably adjusted such that the fluorine mixed gas reserved in the mixing container by one preparation can satisfy at least a single supply for gas addition to the chamber and at least a single supply for subsequent gas exchange of the chamber, or can satisfy two or more supply for gas addition. Even in such a case, for example, if the pressure of fluorine mixed gas in the mixing container decreases due to a single or multiple times supply for gas addition to the chamber, and the gas addition to chamber using the pressure difference cannot continue but gas exchange in the chamber is necessary, the fluorine mixed gas may be supplied after evacuating the chamber as described above to perform the gas exchange.

In the supplying method of the present invention, a holding container may be provided to the mixing container and the fluorine mixed gas prepared in the mixing container may be introduced and reserved in this holding container and supplied to the use point, so that a new fluorine mixed gas can be prepared by introducing fluorine gas and a diluting gas into the mixing container while supplying the fluorine mixed gas from the holding container to the use point. Thus, continuous supply of fluorine gas can be attained. In this case, the valve between the holding container and the mixing container is naturally closed at the supply of fluorine mixed gas introduced into the holding container.

The apparatus for supplying fluorine gas of the present invention is described below. The apparatus comprises a fluorine gas-generating means capable of generating fluorine gas by controlling a fluorine-occluding substance to a predetermined temperature, and a mixing container for preparing a fluorine mixed gas by introducing and mixing the fluorine gas generated and a diluting gas and holding the fluorine mixed gas prepared. According to the supplying apparatus of the present invention, a fluorine-occluding substance is used for a fluorine generating means, therefore, the size of the apparatus as a whole can be decreased and handleability can be improved. At the same time, by supplying a fluorine mixed gas with an appropriate concentration and pressure prepared and reserved in the above-described mixing container to a destination of the supply such as the above-described chamber, the supplying method of the present invention can be practiced.

The above-described fluorine gas-generating means comprises a fluorine gas-generating container for holding the above-described fluorine-occluding substance, a heating means such as heating wire provided in the periphery of the fluorine gas-generating container, and a temperature controlling means for controlling the heating temperature, in which fins are provided in the above-described fluorine gas-generating container. In the case where the fluorine gas-generating container is heated from outside by the above-described temperature controlling means, the rate of heat transfer to the fluorine-occluding substance can be increased through the fins and thereby the temperature of the fluorine-occluding substance can be exactly and swiftly controlled. The heating means such as heating wire may be disposed in the periphery of the generating container or may be integrated into the inside of the generating container. When a cooling means for cooling the periphery of a valve provided on the above-described fluorine gas-generating container is disposed in addition to the heating means and the temperature controlling means described above, the heat given to the fluorine gas-generating container at the time of generation of fluorine gas may be prevented from propagating to the valve. Furthermore, when a mixing accelerating means for accelerating the mixing of the above-described fluorine gas introduced into the mixing container with a diluting gas is disposed, the time necessary for the preparation may be shortened and at the same time, a fluorine mixed gas free of biased fluorine gas concentration can be produced and supplied.

In the supplying apparatus of the present invention, as described above, a holding container may be provided with the mixing container, so that a new fluorine mixed gas can be prepared in the mixing container while supplying fluorine mixed gas from the holding container. Furthermore, a plurality of the above-described mixing containers may be disposed such that introduction of the fluorine gas and a diluting gas can be selectively performed among those mixing containers, and supply of the above-described fluorine mixed gas prepared can be selectively performed. Also in this case, a new fluorine mixed gas may be prepared by introducing fluorine gas and diluting gas into at least one mixing container while supplying fluorine mixed gas from at least another mixing container. Thus, in either case, the preparation and supply of fluorine mixed gas can be performed in parallel and the fluorine gas can be. continuously supplied. Of course, a plurality of mixing containers each provided with a holding container may also be disposed. Furthermore, a plurality of fluorine gas-generating means may be disposed such that fluorine gas can be introduced to a mixing container selectively from these fluorine gas-generating means. In this case, fluorine gas can be generated and stored in at least one fluorine gas-generating means while introducing fluorine gas generated in at least another fluorine gas-generating means into the mixing container, or fluorine gas generated may be simultaneously introduced into the mixing container. Thus, the introduction of fluorine gas into the mixing container can also be continuously performed.

DESCRIPTION OF THE PREFERRED EMBODIMENTS

Figure 1:
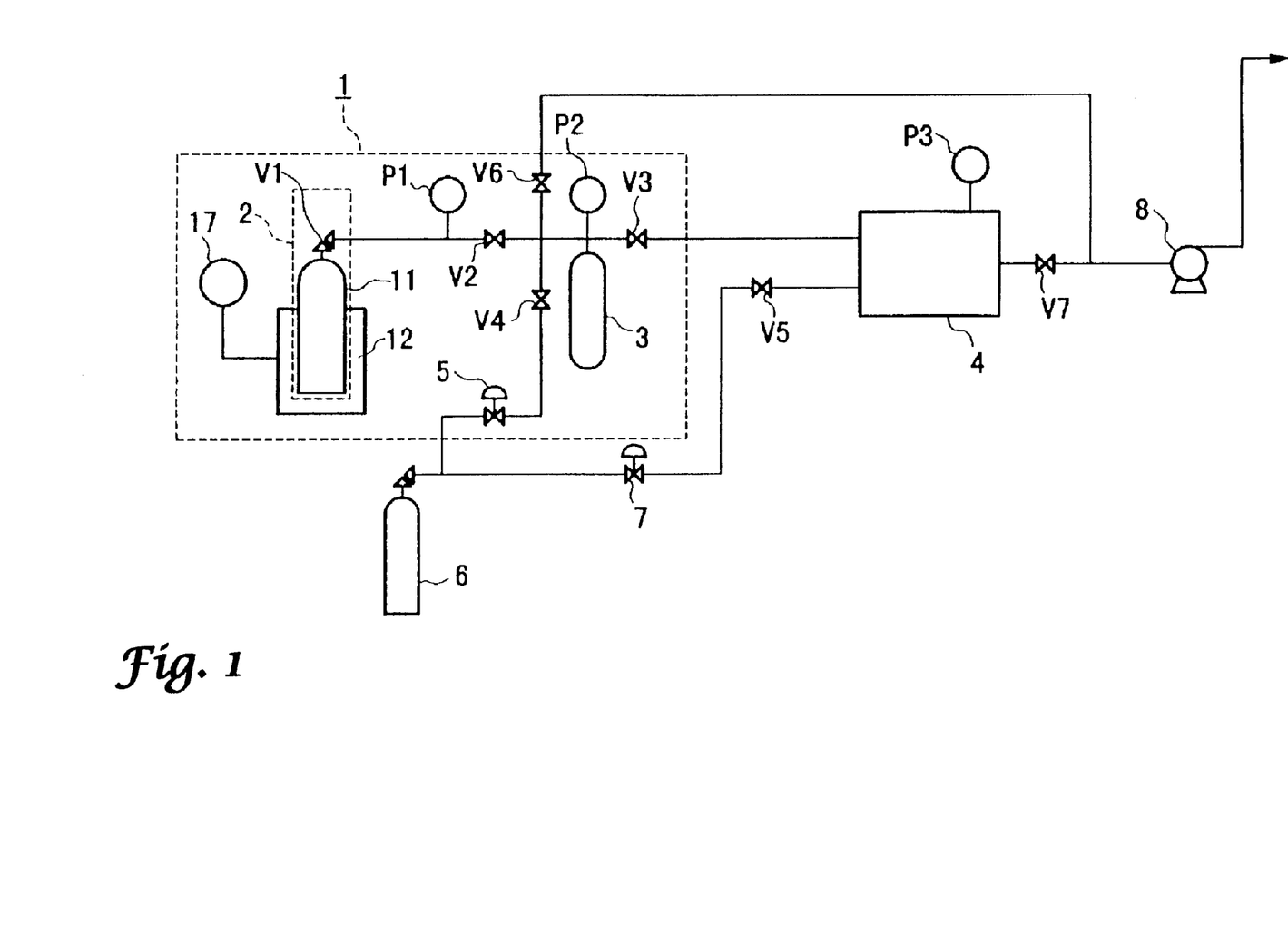
FIG. 1 is a view showing a fluorine gas supplying apparatus 1 in the first embodiment of the present invention and an excimer laser device comprising the supplying apparatus 1.

FIGS. 1 to 4 each is a view showing an apparatus 1 for supplying fluorine gas according to the first embodiment of the present invention and an excimer laser device equipped with the fluorine gas supplying apparatus 1. The supplying apparatus 1 may also be used irrespective of the excimer laser device. As shown in FIG. 1, the supplying apparatus 1 according to this embodiment comprises a fluorine gas-generating means 2 and a mixing container 3 connected to a valve V1 of the fluorine gas-generating means 2 through a valve V2. The mixing container 3 is further connected to the chamber 4 of the above-described excimer laser device through a valve 3. Between the valve V1 and the valve V2 and between the mixing container 3 and the chamber 4, pressure measuring means P1 to P3 such as pressure gauge are disposed. To the mixing container 3, a diluting gas bomb 6 filled with a diluting gas is connected through a valve V4 and a pressure-controlling valve 5. This diluting gas bomb 6 is also connected to the above-described chamber 4 through a pressure-controlling valve 7 and a valve V5. On the other hand, the above-described mixing container 3 and the chamber 4 are connected to a vacuum pump 8 through valves V6 and V7, respectively, so that the gases in the mixing container 3 and the chamber 4 can be evacuated.

Figure 2:
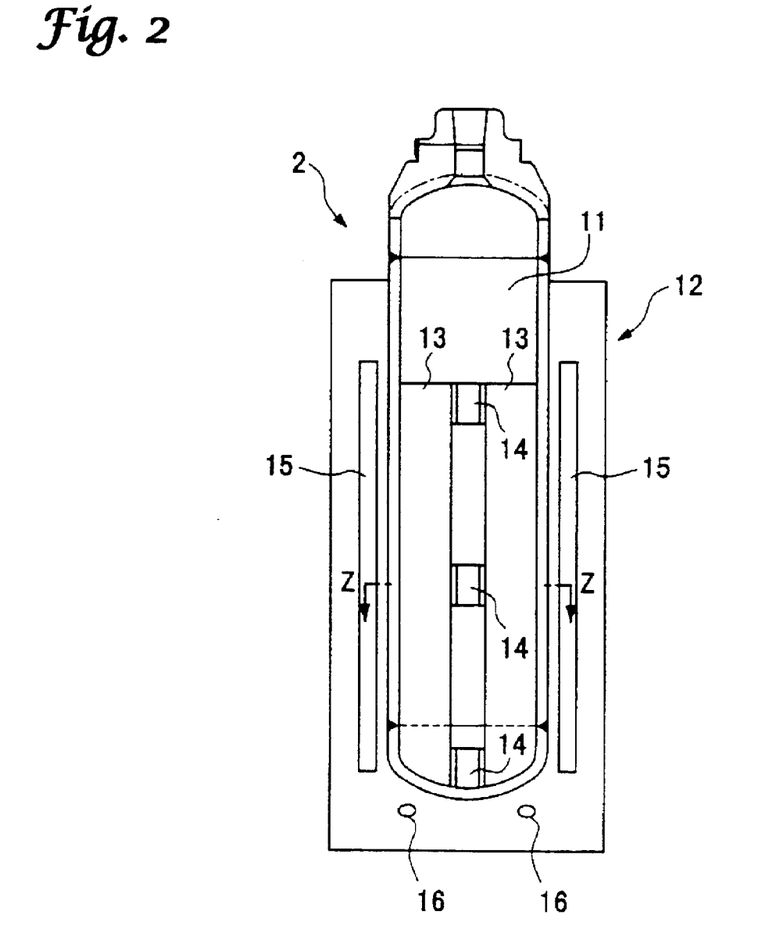
FIG. 2 is a cross section showing the fluorine gas-generating means 2 in the first embodiment shown in FIG. 1.
Figure 3:
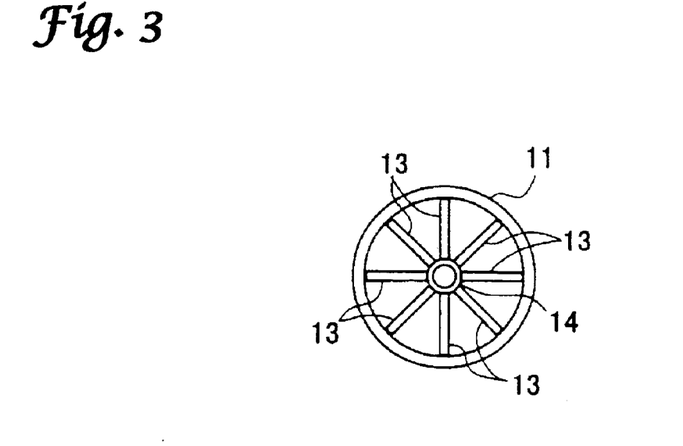
FIG. 3 is a cross section of Z—Z in FIG. 2.

As shown in FIGS. 2 and 3, the above-described fluorine generating means 2 roughly comprises a fluorine gas-generating container 11 for holding a fluorine-occluding substance (not shown) and a holder 12 for holding the fluorine gas-generating container 11. In this embodiment, the above-described fluorine gas-generating container 11 is formed of a nickel alloy such as Monel metal, or nickel. As shown in FIG. 2, the fluorine gas-generating container 11 has a cylindrical shape with both ends being closed, where the above-described valve V1 is fixed to the upper end part. In the lower side of the inner peripheral part thereof, a plurality of plate-like fins 13 are provided (8 sheets in this embodiment). Here, a plate-like fin is shown as one example. As shown in FIGS. 2 and 3, the fins 13 are radially joined and fixed to the outer periphery of three cylindrical core parts 14 coaxially arranged at intervals, so that the fins are equally spaced in the circumferential direction. The fins are loosely inserted to have a small gap from the inner circumferential surface of the fluorine gas-generating container 11 and interiorly placed to extend in the centerline direction (vertical direction) of the fluorine gas-generating container 11.

In this embodiment, the above-described fluorine-occluding substance is fluoronickel material mainly comprising K, Ni and F, such as $K_3NiF_7$, described in International Patent Application No. 5-502981 supra. This substance is decomposed by heating into $K_3NiF_6$ and $1/2\ F_2$ to generate fluorine gas $F_2$. The total of the main components K, Ni and F in the fluorine-occluding substance is preferably 90 wt % or more. If less than this range, the necessary amount of fluorine gas may not be generated unless the substance is heated at a relatively high temperature, or the purity of fluorine gas generated may be impaired.

In the above-described holder 12, heating wires 15 and 16 each is ramified as heating means in this embodiment. The temperature of the fluorine-occluding substance in the fluorine gas-generating container 11 heated by these heating wires 15 and 16 can be controlled to a predetermined temperature by the temperature controller 17 as a temperature controlling means in this embodiment. In the case when the temperature of the connection between the fluorine gas-generating container 11 and the valve V1 and the temperature of the valve V1 must be prevented from increasing, a cooling means for cooling these parts is.preferably provided by forming a heat sinking part at the top of the fluorine gas-generating container 11 or the like or installing a cooling fan.

Figure 4:
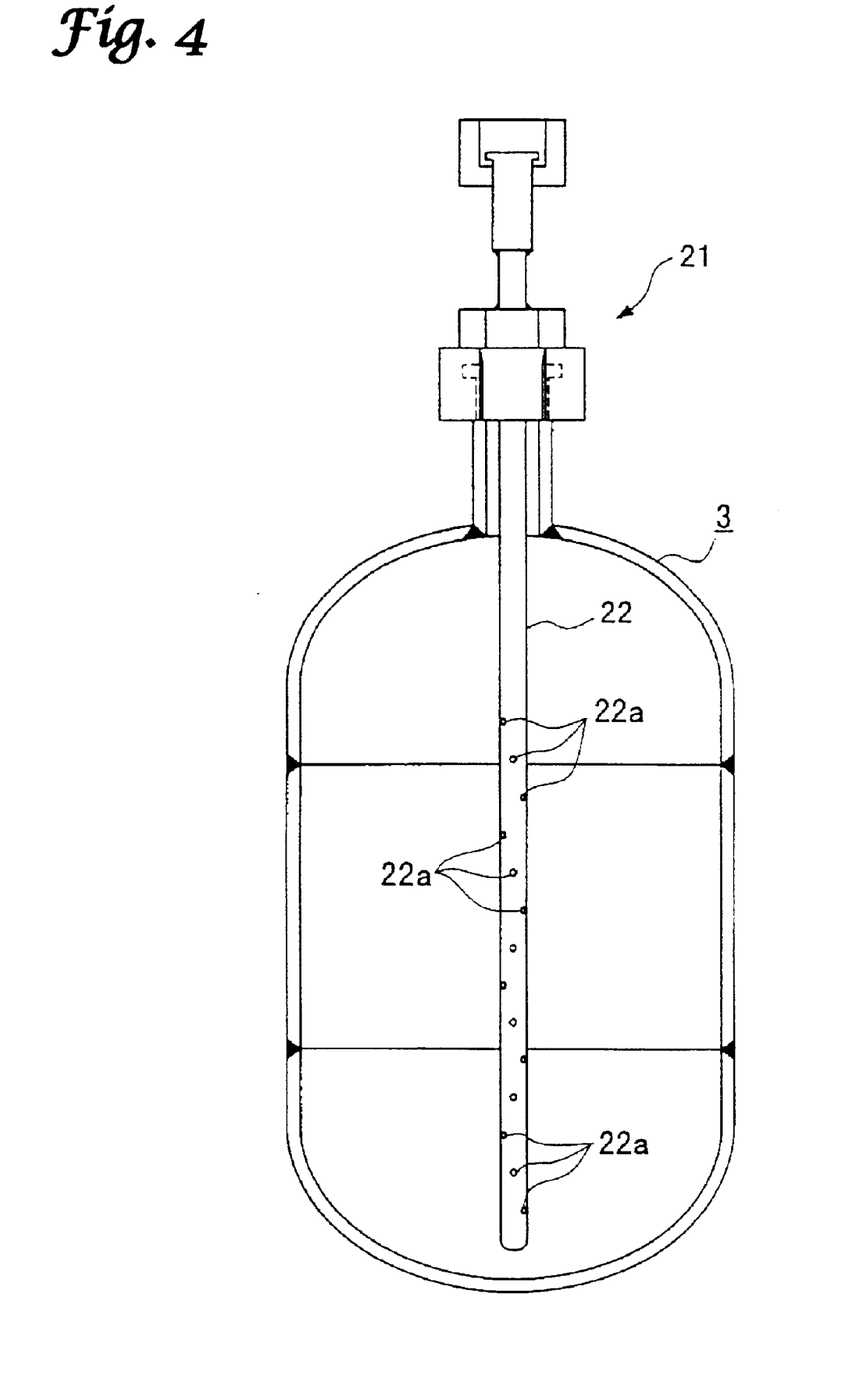
FIG. 4 is a cross section showing the mixing container 3 in the embodiment shown in FIG. 1.

As shown in FIG. 4, the above-described mixing container 3 in this embodiment is a pressure-resistant container formed of stainless steel or the like and having a nearly cylindrical form with a bottom and with a cover, of which the cross section assumes an elliptical form. At the upper end part thereof, a connection terminal 21 connected to the above-described valves V2, V3, V4 and V6 and the pressure measuring means P2 is provided, and at the inside of the mixing container 3, an interpolation tube 22 as a mixing accelerating means of this embodiment is inserted from the connection terminal 21 along the center line of the mixing container 3. This interpolation tube 22 is closed at the bottom end and on the outer periphery of the part positioned inside the mixing container 3, a plurality of through holes 22a are formed at intervals along the longitudinal direction (center axis direction above). In this embodiment, these through holes 22a are spirally arranged. The fluorine gas supplied from the above-described fluorine gas-generating means 2 and the diluting gas supplied from the diluting gas bomb 6 are introduced into the mixing container 3 through this interpolation tube 22. Also, the fluorine mixed gas prepared in the mixing container 3 is supplied to the above-described chamber 4 through the interpolation tube 22.

All of or a part of the internal surface of each unit parts exposed to fluorine gas or fluorine mixed gas, such as mixing container 3, the above-described fluorine gas-generating container 11 of fluorine gas-generating means 2, chamber 4, connecting piping for connecting these, and valves V1 to V7 and pressure controlling valves 5 and 7 provided on the connection piping, is subjected to electro-less nickel plating and then enforced oxidation and thereafter, a fluorinated layer having a thickness of 0.5 μm or more is formed thereon. The fluorinated layer may be formed by the method described, for example, in JP-A-11-92912. More specifically, the metal material or metal film constituting the internal surface of the unit parts is enforcedly oxidized with at least one of oxygen generated from an anode by anodization, nitrous oxide, nitrogen peroxide, ozone and a mixed gas containing such gas, or with an oxidizing substance such as nitric acid or aqueous hydrogen peroxide-containing solution, and the thus-obtained enforced oxide film is reacted with fluoride gas to form the fluorinated layer. As the fluoride gas, at least one of fluorine, chlorine trifluoride and nitrogen fluoride, or a gas obtained by diluting such a gas with an inert gas may be used.

In this embodiment, the excimer laser device to which fluorine gas is supplied from the fluorine gas supplying apparatus 1 having the above-described construction is preferably disposed such that the chamber 4 and the supplying apparatus 1 part enclosed by a dashed line in FIG. 1 are integrated or housed at least in the same room adjacent to each other. However, the supplying apparatus 1 may also be disposed in a separate room or house or in a different place. In this embodiment, the respective valves V1 to V7 and pressure controlling valves 5 and 7 of the supplying apparatus 1 and the excimer laser device may be automatically opened or closed under the control of a control device such as a computer (not shown) based on the measurement results of the pressure measuring means P1 to P3 according to an embodiment of the method for supplying fluorine gas of the present invention, which is described below.

A specific embodiment of the supplying method according to the present invention is described below, where fluorine gas is supplied as a fluorine mixed gas diluted with a diluting gas using a supplying apparatus 1 constructed as above and an excimer laser device equipped with the supplying apparatus 1 to the chamber 4 of the excimer laser device. This embodiment is conditioned such that in the initial state, the mixing container 3, the chamber 4 and the fluorine gas-generating container 11 are evacuated and respective valves V1 to V7 are closed. The numerical values such as temperature, pressure and concentration used in the description are only exemplary and the present invention should not be construed as being limited thereto. The pressure is expressed as units of absolute pressure.

In the fluorine gas-generating means 2, the above-described heating wires 15 and 16 as heating means are charged to heat and maintain the fluorine-occluding substance in the fluorine gas-generating container 11 at from 270 to 500° C. (for example, at 350° C.) to thereby generate fluorine gas. The pressure of fluorine gas generated is measured by the pressure measuring means P1 by opening the valve V1. When the generation pressure reaches a predetermined pressure (for example, about 0.4 MPa at a heating temperature of 350° C.), the valve V2 is opened as it is and while measuring the pressure by the pressure measuring means P2, fluorine gas is introduced into the mixing container 3 through the interpolation tube 22 and when a predetermined pressure (for example, 0.05 MPa) is reached, the valve V2 is closed.

Thereafter, the valve V4 is opened and the above-described diluting gas is introduced from the diluting gas bomb 6 into the mixing container 3 also through the interpolation tube 22 while reducing the pressure by the pressure-controlling valve 5. When the total pressure determined by the pressure measuring means P2 reaches a predetermined pressure (for example, 1.00 MPa), the valve V4 is closed and the state is kept as it is for from 2 to 3 minutes, whereby a fluorine mixed gas having a fluorine gas concentration of 5.0 vol % is prepared and reserved in the mixing container 3. The pressure of the fluorine mixed gas reserved in the mixing container 3 is considered to be sufficiently higher than the pressure in the chamber 4 of an operating excimer laser device (for example, from 0.3 to 0.4 MPa) The thus-prepared fluorine mixed gas is supplied from the mixing container 3 to the previously evacuated chamber 4 by opening the valve V3. When the pressure in the chamber 4 measured by the pressure measuring means P3 reaches a predetermined pressure, the valve V3 is closed. Subsequently, if only rare gas needs to be introduced into the chamber 4, a rare gas is first introduced from a bomb or the like (not shown) and then a diluting gas is introduced from the diluting gas bomb 6 to the chamber 4 through the pressure controlling valve 7 by opening the valve V5. Thus, the fluorine gas in the chamber 4 is further diluted to appropriately adjust the fluorine gas concentration and the rare gas concentration and also to adjust the pressure in the chamber 4 to the above-described operating pressure. As a result, the excimer laser device can generate excimer laser oscillation.

As the excimer laser oscillation continues, fluorine in the chamber 4 is consumed and the laser properties are diminished. When diminishment in the laser properties is observed, a fluorine mixed gas is intermittently supplied in a necessary amount in each supply from the mixing container 3 to the chamber 4 through the valve V3 using the pressure difference (gas addition step) while the pressure in the chamber 4 stays in the range of the above-described operating pressure. The necessary amount may be feedback controlled by the state of the laser properties.

As the addition of fluorine mixed gas to the chamber 4 continues, the pressure in the mixing container 3 decreases to the extent that there is no difference from the operating pressure in the chamber 4, and the pressure of fluorine mixed gas becomes insufficient to add the fluorine mixed gas to the chamber 4. Furthermore, as the fluorine in the chamber 4 is consumed by laser oscillation, impurities in the chamber 4 increase and the laser properties may not recover only by the addition of fluorine mixed gas. In such a case, the operation of the excimer laser device is stopped in order to evacuate the chamber 4, and then the fluorine mixed gas in the mixing container 3, the rare gas and the diluting gas are to be supplied again to the chamber 4 (gas exchange step). Note here that in performing the gas exchange, the amount of fluorine mixed gas remaining in the mixing container 3 (the product of the capacity of mixing container 3 and the pressure of residual fluorine mixed gas) must be larger than the amount necessary for gas exchange.

In this gas exchange step, the valve V7 is opened while leaving other valves V3 and V5 connected to the chamber 4 closed, and the gas in the chamber 4 is evacuated by the vacuum pump 8. Thereafter, similarly to the case of first supplying fluorine mixed gas to the chamber 4, after the valve V7 is closed, the valve V3 is opened to supply the fluorine mixed gas from the mixing container 3 to the chamber 4 until a predetermined pressure is reached, then the valve V3 is closed, rare gas is introduced in the case where only rare gas needs be supplied to the chamber 4, the valve V4 is opened, and the diluting gas is supplied to the chamber 4 to dilute the gas in the chamber 4 to attain an appropriate fluorine gas concentration and at the same time an appropriate rare gas concentration and also to adjust the total pressure to the above-described operating pressure.

On the other hand, after passing through such gas addition step and gas exchange step, fluorine mixed gas reserved in the mixing container 3 decreases to cause the above-described difficulties, namely, fluorine mixed gas cannot be supplied to the chamber 4 in the operating state using the pressure difference or the amount of fluorine mixed gas is smaller than the amount necessary for gas exchange. In such a case, a new fluorine mixed gas is prepared in the mixing container 3 and for this purpose, two methods may be selected in this embodiment.

One is a method of evacuating the mixing container 3 to discharge the residual fluorine mixed gas and freshly preparing a new fluorine mixed gas. In this method, the valve V6 is opened while leaving the valves V2, V3 and V4 closed, the mixing container 3 is evacuated by the vacuum pump 8 and then the valve V6 is closed. Thereafter, similarly to the case of firstly preparing a fluorine mixed gas, the valve V2 is opened to introduce fluorine gas into the mixing container 3, then valve V2 is closed, and the valve V4 is opened to introduce a diluting gas to prepare a fluorine mixed gas having a predetermined pressure and a predetermined fluorine gas concentration. Accordingly, in this case, the partial pressures of fluorine gas and diluting gas introduced into the mixing container 3 and the total pressure of fluorine mixed gas prepared all are the same as the pressures at the first time preparation of fluorine mixed gas.

Another is a method where the mixing container 3 is not evacuated as above but opening the valve V6 while leaving the valves V2, V3 and V4 closed, extracting a part of the residual fluorine mixed gas and when the total pressure reaches a certain constant pressure, closing the valve V6. Thereafter, the valve V2 is opened to introduce fluorine gas into the mixing container 3, the valve V2 is closed and then the valve V4 is opened to introduce the diluting gas to prepare a new fluorine mixed gas while allowing fluorine mixed gas to remain in the mixing container 3. In other words, the fluorine gas concentration of fluorine mixed gas remaining in the mixing container 3 is not changed from that of the gas initially prepared and the pressure of residual fluorine mixed gas can be measured by the pressure measuring means P2, therefore, the partial pressure of fluorine gas in the residual fluorine mixed gas, namely, the amount of residual fluorine gas can be known from the fluorine gas concentration and pressure. By appropriately setting the partial pressures of fluorine gas and diluting gas newly introduced according to the amount of residual fluorine gas determined, a fluorine mixed gas having the same fluorine gas concentration as the firstly prepared fluorine mixed gas can be prepared.

In this other method, fluorine mixed gas remains in the mixing container 3. Accordingly, if this method is applied to the second time preparation of fluorine mixed gas subsequent to the first time preparation where fluorine mixed gas is prepared after the mixing container 3 is evacuated, and when fluorine gas is introduced at the same partial pressure as in the first time preparation and a fluorine mixed gas having the same total pressure as in the first time preparation is prepared, the fluorine gas concentration differs between the newly prepared fluorine mixed gas and the previously prepared fluorine mixed gas because of the remaining fluorine gas in the fluorine mixed gas. Therefore, in the case of employing the above-described other method at the second time preparation, two methods may be further selected in this embodiment for preparing a fluorine mixed gas having the same fluorine gas concentration as in the first time preparation. One is a method of setting the partial pressure of fluorine gas introduced into the mixing container 3 at the first time preparation and the partial pressure of fluorine gas introduced into the mixing container 3 at the second time preparation, to the same constant value, where the total pressure of fluorine mixed gas prepared differs between the first time preparation and the second time preparation but the fluorine gas concentration is the same and constant in the fluorine mixed gases. Another is a method of setting the partial pressure of fluorine gas introduced to be different between the first time preparation and the second time preparation and thereby making the total pressure of fluorine mixed gas prepared to be the same and constant between the first time preparation and the second time preparation.

Table 1 below shows a case where a new fluorine mixed gas is prepared after the mixing container 3 is once evacuated (CASE 1), a case where a new fluorine mixed gas is prepared while allowing fluorine mixed gas to remain in the mixing container 3 and at the same time, the partial pressure introduced into the mixing container 3 is made constant (CASE 2), and a case where a new fluorine mixed gas is prepared while allowing fluorine mixed gas to remain in the mixing container 3 and at the same time, the total pressure of fluorine mixed gas prepared is made constant (CASE 3). The fluorine gas concentration is set to be equal at 5.0 vol % between the first time preparation of fluorine mixed gas in the precedently evacuated mixing container 3 and the second time preparation of a new fluorine mixed gas, and at the same time, the total pressure of fluorine mixed gas prepared second time is set to 1.00 MPa. The total pressure of fluorine mixed gas remaining in the mixing container 3 before the preparation, the partial pressures of fluorine gas and diluting gas introduced at the preparation, and the pressure (total pressure) of fluorine mixed gas prepared, each for the first time preparation and the second time preparation are shown in Table 1 below. CASE 2 and CASE 3 are conditioned so that a fluorine mixed gas of 0.10 MPa remains at the second time preparation.

TABLE 1

| | Pressure of Remaining Gas before Preparation (total pressure) | Pressure of Fluorine Gas Introduced (partial pressure) | Pressure of Diluting Gas Introduced (partial pressure) | Pressure of Fluorine Mixed Gas after Preparation (total pressure) |
|---|---|---|---|---|
| CASE 1 | | | | |
| 1st time | Vacuum | 0.05 MPa | 0.95 MPa | 1.00 MPa |
| 2nd time | Vacuum | 0.05 MPa | 0.95 MPa | 1.00 MPa |
| CASE 2 | | | | |
| 1st time | Vacuum | 0.045 MPa | 0.855 MPa | 0.90 MPa |
| 2nd time | 0.10 MPa | 0.045 MPa | 0.855 MPa | 1.00 MPa |
| CASE 3 | | | | |
| 1st time | Vacuum | 0.05 MPa | 0.95 MPa | 1.00 MPa |
| 2nd time | 0.10 MPa | 0.045 MPa | 0.855 MPa | 1.00 MPa |

In CASE 1 where the mixing container 3 is precedently evacuated whenever fluorine mixed gas is prepared, the respective partial pressures of fluorine gas and diluting gas introduced are the same between the first time preparation and the second time preparation, and the total pressures of the fluorine mixed gas prepared are also the same. In CASE 2 where a new fluorine mixed gas is prepared while allowing the first time fluorine mixed gas to remain in the mixing container 3 and at the same time, the partial pressure of fluorine gas introduced into the mixing container 3 is set to a constant value of 0.045 MPa at the first time and second time preparations, the fluorine mixed gas remaining in the mixing container 3 also has a fluorine gas concentration of 5.0 vol %, therefore, in order to prepare a fluorine mixed gas having a fluorine gas concentration of 5.0 vol % from the residual fluorine mixed gas and the newly introduced fluorine gas, the diluting gas must be introduced at the same partial pressure between the first time preparation and the second time preparation. As a result, the total pressure of fluorine mixed gas prepared the second time is naturally higher than that at the first time preparation by the pressure portion of the residual fluorine mixed gas.

In CASE 3 where a new fluorine mixed gas is prepared while allowing the fluorine mixed gas to remain and at the same time, the total pressure of fluorine mixed gas prepared is set to be constant at the first time and second time preparations, the fluorine gas concentration is a constant value of 5.0 vol %, therefore, the partial pressure of fluorine gas or diluting gas newly introduced is reduced by the portion of the residual fluorine mixed gas. In any of CASE 1, CASE 2 and CASE 3, the partial pressures of fluorine gas and diluting gas at the third time or subsequent preparation of a new fluorine mixed gas under the same conditions of respective cases are the same as those in the second time preparation. At this time, the total pressure does not increase even in CASE 2.

As such, according to the method for supplying fluorine gas in this embodiment, a fluorine-occluding substance is heated and controlled to a predetermined temperature by heating means (heating wires 15 and 16) and temperature controlling means (temperature controller 17) in the fluorine gas-generating means 2 to generate a low-pressure fluorine gas, therefore, safety is high and handling is easy as compared with the handling of a high-pressure fluorine gas filled in a bomb having a large weight. According to this embodiment, the fluorine gas generated and a diluting gas are introduced into a mixing container 3 and mixed to prepare and reserve a fluorine mixed.gas and the fluorine gas is supplied as the above-described fluorine mixed gas from the mixing container 3. Therefore, a fluorine mixed gas can be prepared to have exactly a predetermined fluorine gas concentration with good reproducibility in accordance with the partial pressure of fluorine gas introduced, at the same time, generation of biased fluorine gas concentration can be prevented and fluorine gas in a constant concentration can be supplied in a stable manner. Furthermore, the low-pressure fluorine gas is formed into a high-pressure fluorine mixed gas with an aid of the pressure of a diluting gas and the fluorine gas can be supplied using the pressure difference without requiring any circulating unit or the like.

In the preparation of fluorine mixed gas in the mixing container 3, when the mixing container 3 is once evacuated and then a fluorine mixed gas is anew prepared as in CASE 1, the conditions such as pressure of fluorine gas or diluting gas can be made constant irrespective of first time preparation or second time preparation and thereby, the operation is extremely facilitated. In this case, the mixing container 3 is preferably evacuated until the pressure therein becomes less than 0.01 MPa. If fluorine mixed gas at a pressure in excess of this range remains in the mixing container 3, the pressure of newly prepared fluorine mixed gas becomes different from the pressure at the precedent preparation and the fluorine mixed gas may not be prepared under exactly the same conditions.

In the case where a next fluorine mixed gas is newly prepared while allowing the previously prepared fluorine mixed gas to remain in the mixing container 3 as in CASE 2 and CASE 3, fluorine gas or diluting gas in the residual fluorine mixed gas is not wastefully discharged and this is profitable. Moreover, when the pressure of fluorine gas introduced is made constant as in CASE 2, the operation of introducing fluorine gas can be easily performed under constant conditions. On the other hand, when the total pressure of fluorine mixed gas prepared is made constant as in CASE 3, the pressure (total pressure) of fluorine mixed gas after the preparation can be always constant and therefore, the operation of supplying fluorine mixed gas from the mixing container 3 to the use point can be performed in a stable manner.

To the contrary, since the total pressure of fluorine mixed gas after the preparation may vary in CASE 2 or the pressure of fluorine gas newly introduced must be varied in CASE 3, the operation in these cases is inevitably cumbersome as compared with CASE 1. Therefore, taking into account the profitability in the case of discharging the residual fluorine mixed gas and the profitability in the case of employing a cumbersome operation, the pressure of the residual fluorine mixed gas is preferably 0.01 MPa or more, more preferably atmospheric pressure or more, for preparing a new fluorine mixed gas while allowing the precedent fluorine mixed gas to remain.

In the foregoing description, fluorine gas is introduced first at a predetermined pressure into the vacuum and then a diluting gas is introduced for preparing fluorine mixed gas after evacuating the mixing container 3 as in the first and second time preparations of CASE 1 or in the first time preparation of CASE 2 and CASE 3. However, the pressure measuring means P1 to P3 for measuring the pressure tend not to be precise particularly in the nearly vacuum state. Therefore, if the fluorine gas and the diluting gas are introduced in this order, error may occur when the pressure of the fluorine gas is measured. This difficulty may be overcome by introducing a diluting gas first at an appropriate pressure (a pressure not exceeding the generation pressure of fluorine gas, for example, 0.10 MPa) into the evacuated mixing container 3, then introducing the fluorine gas at a predetermined partial pressure, and introducing the remaining diluting gas again. In the subsequent preparations of CASE 2 and CASE 3, fluorine mixed gas remains in the mixing container 3, and accordingly, the above-described operation is not necessary.

In the case of supplying fluorine gas (fluorine mixed gas) to the chamber 4 of an excimer laser device according to the supplying method described above, a low-pressure fluorine gas can be formed into a high-pressure fluorine mixed gas by mixing a diluting gas in the mixing container 3. Therefore, by setting the pressure of the fluorine mixed gas to be higher than the operating pressure of chamber 4, the fluorine mixed gas can be supplied to the chamber 4 using the pressure difference in the gas addition step even when the excimer laser device is operating, whereby the laser properties diminished due to consumption of fluorine gas can be restored and stable laser oscillation can be continuously achieved. Moreover, the fluorine mixed gas is reserved in the mixing container 3 and thereby the fluorine gas is uniformly dispersed therein, therefore, even when supplied to the chamber 4, the fluorine gas concentration can be prevented from generation of a biased portion and the laser properties can be almost free of bad effect.

In the case where the pressure of fluorine mixed gas prepared in the mixing container 3 is set to be higher than the operating pressure of chamber 4, it is efficient to perform at least one gas exchange step to supply the fluorine mixed gas, as in the above-described practical embodiment, after the operation of the excimer laser device is once interrupted to evacuate the chamber 4, in addition to at least one (preferably multiple times) operation of gas addition step as described above. In other words, the amount of fluorine mixed gas prepared in the mixing container 3 (the product of the capacity of mixing container 3 and the total pressure of fluorine mixed gas prepared) is preferably set to be larger than the sum of the amount of fluorine mixed gas added to the chamber 4 in a single operation of gas addition step and the amount of fluorine mixed gas necessary for a single operation of gas exchange step, or larger than the amount of fluorine mixed gas added to the chamber 4 in at least two gas addition step operations.

The order and the number of operations of the gas addition step and gas exchange step are appropriately selected depending on the amount of fluorine mixed gas prepared in the above-described mixing container 3, the amount of fluorine gas consumed in the chamber 4 or the timing of gas exchange necessitated due to generation of impurities accompanying consumption of the fluorine gas. For example, when the amount of fluorine mixed gas prepared in the mixing container 3 is sufficiently large, it may be possible to perform a plurality of gas addition operations according to the consumption of fluorine gas in the chamber 4 after the preparation and subsequent gas exchange, and to again perform gas exchange. To the contrary, in the case where the amount of fluorine mixed gas prepared is small and can only satisfy the supply probably for a single gas addition and a single gas exchange, if gas is first exchanged, the pressure becomes deficient and subsequent gas addition may not be performed. Accordingly, there is no choice but to perform the gas addition first and the gas exchange next. In the case where the laser properties are not restored even if the gas is added because of generation of impurities, there is no other way but to enter the gas exchange step.

Also, in the case where the pressure of fluorine mixed gas reserved in the mixing container 3 is decreased due to gas addition or gas exchange and makes almost no difference from the operating pressure in the chamber 4, the gas addition cannot be performed any more. For newly preparing a fluorine mixed gas in the mixing container 3, the fluorine mixed gas is prepared after evacuating the mixing container 3 to discharge the residual fluorine mixed gas as in CASE 1 or by introducing fluorine gas and diluting gas while allowing the fluorine mixed gas to remain as in CASE 2 and CASE 3. In this case, when the amount of residual fluorine mixed gas is large enough for the gas exchange of chamber 4, the gas exchange may also be performed by evacuating the chamber 4 and supplying the residual fluorine mixed gas to the chamber 4 using the pressure difference.

Accordingly, in the case where the pressure of fluorine mixed gas in the mixing container 3 and the operating pressure in the chamber 4 are equal and the amount of fluorine mixed gas is sufficiently large, whether to perform gas exchange or newly prepare fluorine mixed gas may be judged at the time of entering this condition by taking account of, for example, the state of laser properties. To speak more strictly, for supplying fluorine mixed gas from the mixing container 3 to the chamber 4 in the operating state, it is necessary that a certain degree of difference be present between the pressure of mixing container 3 and the pressure of chamber 4, but if the operating pressure of mixing chamber 3 is slightly higher than the pressure of chamber 4, the fluorine mixed gas cannot be supplied from the mixing container 3 to the chamber 4. Accordingly, the above-described judgment is preferably made in the state that the pressure of the fluorine mixed gas in the mixing container 3 is higher than the operating pressure of chamber 4, for example, by approximately from 0.01 to 0.05 MPa or more.

In the fluorine gas supplying apparatus 1 of this embodiment, as described above, the fluorine gas-generating means 2 controls the fluorine-occluding substance to a predetermined temperature by heating means (heating wires 15 and 16) and temperature controlling means (temperature controller 17) and thereby fluorine gas is generated, where a necessary amount of fluorine gas can be generated exactly on demand and fluorine gas having small impurities can be always supplied. Moreover, when the low-pressure fluorine gas thus generated is mixed with the diluting gas in the mixing container 3, the pressure increases and the mixing container 3 in this state can be used as an alternate of a high-pressure fluorine mixed gas bomb. The fluorine mixed gas is supplied to the chamber 4 or the like using the pressure, therefore, a high-pressure fluorine gas bomb or a circulating unit for supply can be dispensed with, the supplying apparatus 1 can be downsized and improved in handleability, and the supplying method in this embodiment can be implemented without failure.

In this embodiment, an interpolation tube 22 having a plurality of through holes 22$a$ punched therein at intervals in the longitudinal direction is inserted into the above-described mixing container 3 as a mixing accelerating means. The fluorine gas introduced from the fluorine gas-generating means 2 through the valve V2 and the diluting gas introduced from the diluting gas bomb 6 through the pressure controlling valve 5 and the valve 4 are jetted out from the through holes 22$a$ into the mixing container 3 through the interpolation tube 22. Therefore, these fluorine gas and diluting gas are evenly and uniformly introduced into the mixing container 3 and promptly mixed, so that not only the time necessary for the preparation can be shortened but also the fluorine mixed gas prepared can be surely prevented from generation of a biased portion in the fluorine gas concentration. In this embodiment, the above-described one interpolation tube 22 is inserted into the mixing container 3 and both the fluorine gas and the diluting gas are introduced through this interpolation tube 22. However, these fluorine gas and diluting gas may also be separately introduced by inserting, for example, two interpolation tubes 22, 22. Furthermore, although in this embodiment, the fluorine mixed gas prepared is supplied or discharged by evacuation also through this interpolation tube 22, another tube may be provided for the discharge.

In this embodiment, the interpolation tube 22 having formed thereon through holes 22a is inserted as the mixing accelerating means in the mixing container 3 along the centerline thereof. As the means for accelerating the mixing of gas in the mixing container 3, for example, an interpolation tube as in this embodiment may be crosswise provided in the mixing container 3 to intersect with the centerline. Other than the interpolation tube, for example, a baffle may be provided in the mixing container 3 to stir the gas introduced, or the gas inlet into the mixing container 3 may be formed like a spray nozzle. However, the technique of inserting an interpolation tube 22 as in this embodiment is simple. With respect to the construction material of the mixing container 3, the present invention is by no means limited to those described above.

In the above-described fluorine gas-generating means 2 of this embodiment, the fluorine gas-generating container 11 holding the above-described fluorine-occluding substance is held in the inner circumferential part of a holder 12. In the inner circumferential part of the holder 12, the above-described heating wires 15 and 16 as the heating means each is ramified. In the inside of the fluorine gas-generating container 11, fins 13 are provided and the above-described fluorine-occluding substance is filled in the portion where fins 13 are provided. Therefore, the heat generated from the heating wires 15 and 16 can be efficiently transmitted to the fluorine-occluding substance from the fluorine generating container 11 through the fins 13, whereby the temperature of fluorine-occluding substance can be more exactly and swiftly controlled and fluorine gas of a predetermined pressure can be generated without fail. Moreover, the fins 13 are radially fixed to the periphery of cylindrical core parts 14. Therefore, a certain extent of space section is formed at the center part in the fluorine generating container 11 along the center line of the fluorine gas-generating containers 1, and fluorine gas generated even at the bottom of fluorine gas-generating container 11 can surely and swiftly move toward the valve VI through this space. A plate-like fin is shown here as one example but fins having various shapes may be used and the shape of the fin is not limited to this embodiment. However, a plate-like fin is simple and convenient.

Furthermore, in this embodiment, a fluorinated layer described above is formed on the entire or at least a part of the internal surface of each unit parts exposed to fluorine gas or fluorine mixed gas. By virtue of this fluorinated layer, the internal surface of these units can be improved in the corrosion resistance to prevent corrosion due to the reaction with fluorine gas, as a result, the life of the unit parts can be prolonged and in turn the life of the apparatus as a whole can be prolonged. In addition, when corrosion of the unit parts is prevented, generation of impurities in the fluorine gas introduced into the mixing container 3 or fluorine mixed gas supplied to the chamber 4 can be controlled, whereby the excimer laser device can maintain more stable laser output.

The excimer laser device in this embodiment comprising the above-described supplying apparatus 1 is advantageous in that since the supplying apparatus 1 can be downsized, the supplying apparatus 1 and the chamber 4 of the excimer laser device can be integrated or, even when separated, they may be disposed, for example, in the same room adjacent to each other. As a result, the auxiliary facility of the excimer laser device can be downsized, the handling can be facilitated and the size of the installation space can be reduced. In this embodiment, the fluorine gas supplying apparatus 1 and the chamber 4 of the excimer laser device are disposed adjacent to each other. However, the diluting gas bomb 6 or the vacuum pump 8 may be separately disposed in a different room or house. The supplying apparatus 1 itself may also be disposed in a different room or house or in another location.

Figure 5:
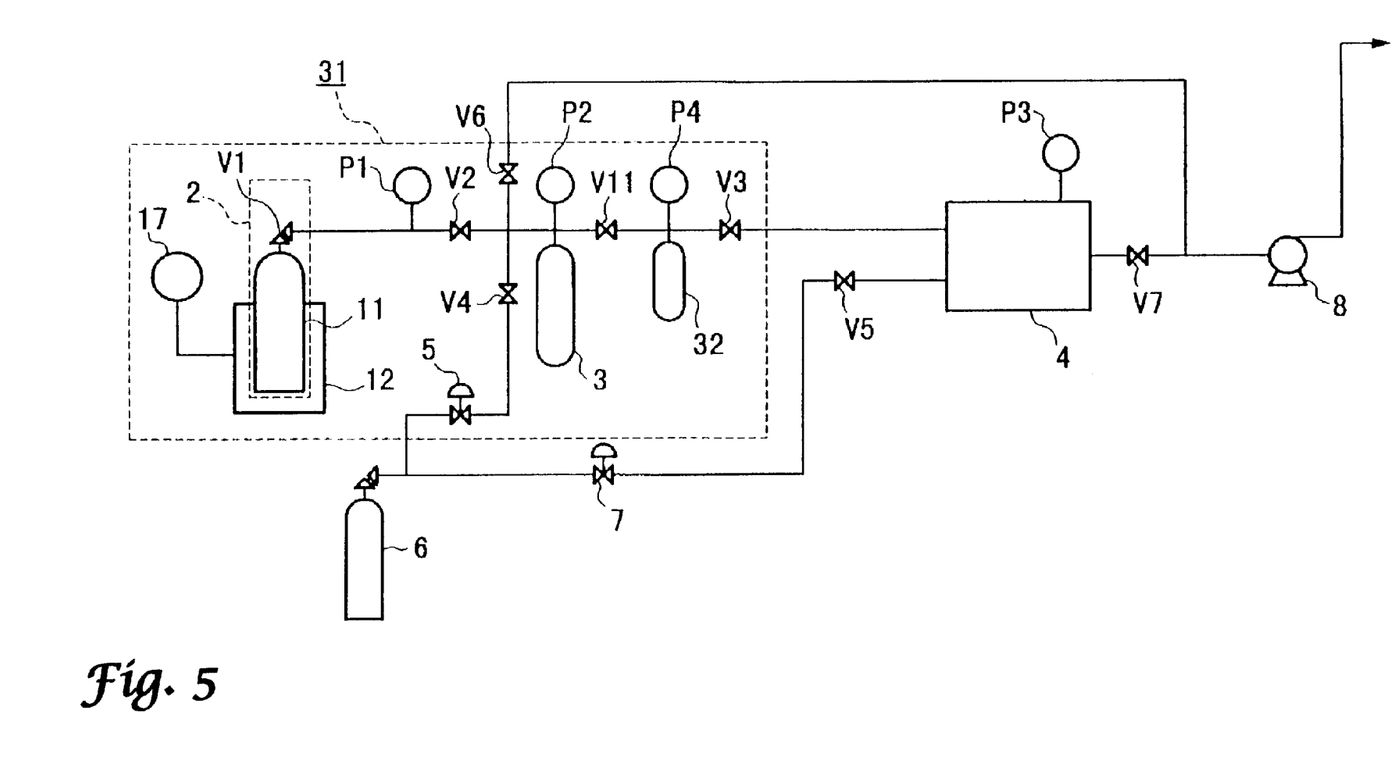
FIG. 5 is a view showing a fluorine gas supplying apparatus 31 in the second embodiment of the present invention and an excimer laser device comprising the supplying apparatus 31.
Figure 6:
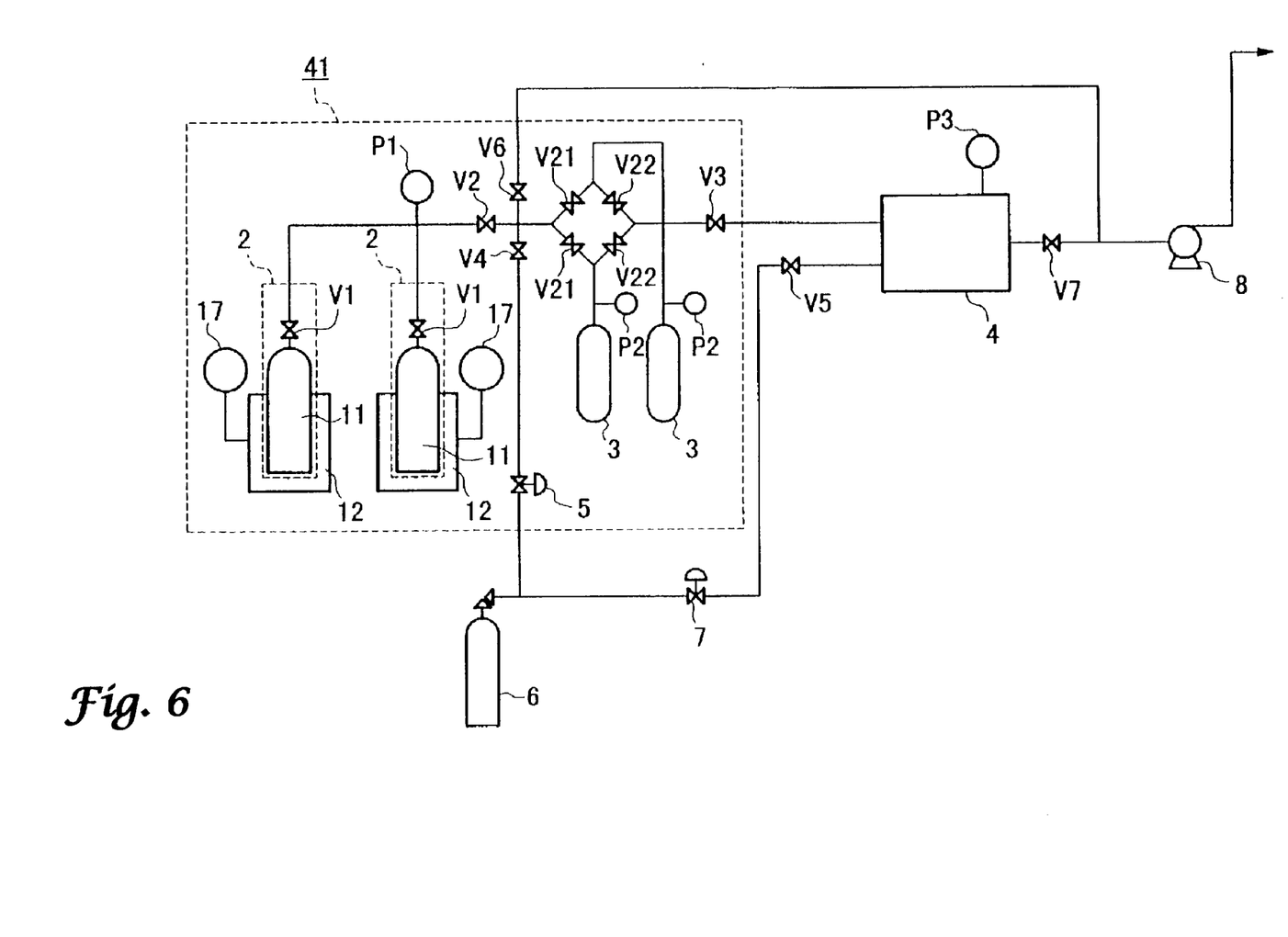
FIG. 6 is a view showing a fluorine gas supplying apparatus 41 in the second embodiment of the present invention and an excimer laser device comprising the supplying apparatus 41.

FIGS. 5 and 6 each is a view showing a fluorine gas supplying apparatus 31 or 41 according to the second or third embodiment of the present invention and an excimer laser device comprising the supplying apparatus 31 or 41. The elements common to the first embodiment shown in FIGS. 1, 2, 3 and 4 are denoted by the same numerals. The second embodiment shown in FIG. 5 is characterized in that the mixing container 3 is provided with a holding container 32 comprising a pressure measuring means P4 and the fluorine mixed gas prepared in the mixing container 3 can be introduced into this holding container 32 and can be once reserved therein. More specifically, in this embodiment, the above-described holding container 32 is disposed between the mixing container 3 of the first embodiment and the valve V3, and a valve V11 is further provided between the holding container 32 and the mixing container 3. The construction material and the shape of this holding container 32 may be appropriately selected, but in this embodiment, the same constructive material and the same shape as the mixing container 3 are used. The capacity thereof is preferably set to be smaller than the mixing container 3 and also in this embodiment, the holding container is so designed.

In the thus-constructed supplying apparatus 31 of the second embodiment, fluorine gas and diluting gas are introduced into the mixing container 3 to prepare a fluorine mixed gas. Thereafter, while leaving the valve V3 closed, the above-described valve V11 is opened to introduce the fluorine mixed gas into the holding container 32. When the pressure measured by the pressure measuring means P4 reaches a predetermined pressure, the valve V11 is closed and thereby the fluorine mixed gas prepared in the above-described mixing container 3 can be once reserved in the holding container 32, at the above-described predetermined pressure while maintaining the fluorine gas concentration as it is. When the predetermined pressure is set to be higher than the operating pressure in the chamber 4, the fluorine mixed gas reserved in the holding container 32 can be supplied to the operating chamber 4 while leaving the valve V11 closed to perform the gas addition step. Furthermore, even when the pressure of the fluorine mixed gas and the operating pressure in the chamber 4 become almost equal, if the amount of residual fluorine mixed gas is larger than the amount necessary for the gas exchange of chamber 4, the gas exchange step can be performed by evacuating the chamber 4 and then opening the valve V3. Even when the amount of fluorine mixed gas remaining in the holding container 32 is deficient to the amount necessary for the gas exchange of chamber 4, if the total amount of fluorine mixed gas in the mixing container 3 and the holding container 32 satisfies the amount necessary for the gas exchange of chamber 4, the gas in both the mixing container 3 and the holding container 32 may be used for the gas exchange of chamber 4.

According to this embodiment, while supplying fluorine mixed gas from the holding container 32 to the chamber 4, the mixing container 3 is disconnected from the holding container 32 by closing the valve V11 and therefore, a new fluorine mixed gas can be prepared and reserved in the mixing container in the meantime. After introducing the thus-prepared new fluorine mixed gas into the holding container 32 by opening the valve V11 while leaving the valve V3 closed, and the fluorine mixed gas can be swiftly supplied to the chamber 4 by closing the valve V11 and then opening the valve V3. Accordingly, even if the fluorine mixed gas reserved in the holding container 32 is reduced, the state capable of continuing the supply of fluorine mixed gas to the chamber 4 can be recovered within a short time. For example, even when fluorine gas is severely consumed in the chamber 4, the excimer laser device can be continuously operated without intermitting its operation for the preparation of fluorine mixed gas.

In the supplying apparatus 41 of the third embodiment shown in FIG. 6, a plurality (2 units in this embodiment) of mixing containers 3 and 3 each provided with a pressure measuring means P2 are disposed in parallel between the valves V2, V4 and V6 and the valve V3. Between each mixing container 3 and the valves V2, V4 and V6, valves V21 are provided and between each mixing container 3 and the valve V3, valves V22 are provided. The valves V21 or V22 are connected also in parallel between the mixing containers 3 and 3. In this embodiment, by appropriately closing or opening these valves V21 and V21 and the valves V22 and V22, fluorine gas from the fluorine gas-generating means 2 and diluting gas from the diluting gas bomb 6 can be introduced selectively between the mixing containers 3 and 3. Furthermore, a fluorine mixed gas prepared by mixing the thus-introduced fluorine gas and diluting gas can be supplied to the chamber 4 also selectively between the mixing containers 3 and 3.

Therefore, according to the third embodiment, during the supplying step of fluorine mixed gas from one of mixing containers 3 by opening the valve V22 while leaving the valve V21 closed, fluorine gas and diluting gas can be introduced. To the contrary, by opening the valve V21 while leaving the V22 closed to prepare and reserve fluorine mixed gas in another mixing container 3. When the pressure of fluorine mixed gas in one of mixing containers 3 is decreased, fluorine mixed gas reserved in another mixing container 3 can be supplied by switching over the valves V21 and V21 and the valves V22 and V22. Therefore, also in the supplying apparatus 41 according to the third embodiment, fluorine mixed gas can be continuously supplied without interruption to the chamber 4 of an excimer laser device or the like. As such, in the third embodiment, fluorine mixed gas of another mixing container 3 can be immediately supplied by the switchover of valves V21 and V22, so that the continuous supply can be more accelerated.

Furthermore, in the third embodiment, the same applies to the fluorine gas-generating means 2 and a plurality (in this embodiment, two units the same as the number of mixing containers 3) of fluorine gas-generating means 2 and 2 are disposed in parallel. By appropriately opening or closing the valves V1 and V1 provided to respective fluorine gas-generating means 2 and 2, the fluorine gas generated in these fluorine gas-generating means 2 and 2 can be selectively introduced into the mixing containers 3 and 3. Accordingly, for example, when fluorine occluded in the fluorine-occluding substance in the fluorine gas-generating container 11 is reduced due to generation of fluorine gas in one of fluorine gas-generating means 2 and a sufficiently large generation pressure cannot be obtained, fluorine gas generated in another fluorine generating means 2 can be introduced into the mixing containers 3 and 3 by switching over the valves V1 and V1. In the meanwhile, the fluorine gas-generating container 11 in one of fluorine gas-generating means 2 can be exchanged by a container filled with a fluorine-occluding substance in which fluorine is sufficiently occluded. Therefore, according to the third embodiment, introduction of fluorine gas into the mixing containers 3 and 3 can also be continuously maintained and thereby the supply of fluorine mixed gas to the chamber 4 or the like can be more surely continued.

In the supplying apparatus 41 of the third embodiment, two units of fluorine gas-generating means 2 and 2 and the mixing containers 3 and 3 are disposed. However, even when a plurality of units is disposed for either one of the fluorine gas-generating means or the mixing container, the effect due to the generating means or mixing container can be obtained. In this third embodiment, all or a part of the plurality of mixing containers 3 and 3 may be provided with a holding container 32 as in the second embodiment. If the case is so, the continuous supply of fluorine mixed gas can be more surely achieved.

In the first to third embodiments, the case where fluorine mixed gas prepared is supplied to the chamber 4 of an excimer laser device is described. However, other than this, the present invention may be applied to the supply of fluorine gas in the case, for example, where fluorine gas is used as the cleaning gas of CVD, etching apparatus and the like or for etching gas, in the semiconductor manufacturing process, where fluorine gas is used as a fluorinating agent in the field of general industrial use or chemical use, and where fluorine gas is used for various purposes. In applying the present invention to uses over a broad range including application to the above-described excimer laser device, the fluorine mixed gas prepared in the above-described mixing container 3 is preferably adjusted to a fluorine gas concentration of from 0.5 to 50 vol % and a total pressure at the preparation of from 0.5 to 5.0 MPa. However, in the case of application to an excimer laser device, the fluorine mixed gas prepared in the mixing container 3 is in many cases preferably adjusted to a fluorine gas concentration of from 0.5 to 20 vol % and a total pressure at the preparation of approximately from 0.5 to 1.0 MPa.

As described in the foregoing pages, according to the method and apparatus for supplying fluorine gas of the present invention, a fluorine mixed gas having a predetermined pressure and a predetermined fluorine gas concentration is prepared from the fluorine gas generated by controlling the temperature of a fluorine-occluding substance, so that a necessary amount of fluorine gas can be supplied in a stable manner and in good precision and uniform concentration as a fluorine mixed gas using the pressure of course at the time of exchanging the gas in the chamber of an excimer laser device but even when gas is added during the operation. Furthermore, the apparatus can also be used as a compact, simple and convenient apparatus for the supply of fluorine mixed gas in other uses.

While the invention has been described in detail and with reference to specific embodiments thereof, it will be apparent to one skilled in the art that various changes and modifications can be made therein without departing from the spirit and scope thereof.

What is claimed is:

1. A method for supplying fluorine gas, comprising:
   generating fluorine gas using a fluorine gas-generating means capable of controlling a fluorine-occluding substance to a predetermined temperature,
   introducing the fluorine gas into a mixing container to a predetermined pressure, introducing a diluting gas into the mixing container to a predetermined pressure to mix the diluting gas with said fluorine gas and thereby prepare a fluorine-containing mixed gas having a predetermined pressure and a predetermined fluorine gas concentration and reserve in said mixing container, and supplying the fluorine-containing mixed gas to a use point having a pressure lower than the pressure of the fluorine-containing mixed gas.

2. The method for supplying fluorine gas as claimed in claim 1, wherein after said mixing container is previously evacuated, the method comprises preparing the fluorine-containing mixed gas.

3. The method for supplying fluorine gas as claimed in claim 2, wherein after said mixing container is previously evacuated, the method comprises first introducing said fluorine gas to a predetermined partial pressure, then introducing said diluting gas to prepare the fluorine-containing mixed gas.

4. The method for supplying fluorine gas as claimed in claim 2, wherein after said mixing container is previously evacuated, the method comprises first introducing said diluting gas to a predetermined partial pressure, then introducing said fluorine gas, then introducing said diluting gas again to prepare the fluorine-containing mixed gas.

5. The method for supplying fluorine gas as claimed in any one of claims 2 to 4, wherein the method comprises evacuating said mixing container to a pressure of less than 0.01 MPa.

6. The method for supplying fluorine gas as claimed in claim 1, wherein the method comprises preparing a new fluorine-containing mixed gas in said mixing container while allowing a part of the fluorine-containing mixed gas previously prepared to remain in said mixing container.

7. The method for supplying fluorine gas as claimed in claim 6, wherein the pressure of the fluorine-containing mixed gas remaining in said mixing container is 0.01 MPa or more.

8. The method for supplying fluorine gas as claimed in claim 6, wherein the pressure of the fluorine-containing mixed gas remaining in said mixing container is at atmospheric pressure or more.

9. The method for supplying fluorine gas as claimed in claim 5, wherein the partial pressure of said fluorine gas introduced at the preparation of said new fluorine-containing mixed gas is the same as the partial pressure of said fluorine gas introduced into said mixing container at the preceding preparation of the fluorine-containing mixed gas.

10. The method for supplying fluorine gas as claimed in claim 6, wherein the partial pressure of said fluorine gas introduced at the preparation of said new fluorine-containing mixed gas is the same as the partial pressure of said fluorine gas introduced into said mixing container at the preceding preparation of the fluorine-containing mixed gas.

11. The method for supplying fluorine gas as claimed in claim 5, wherein the total pressure of the fluorine-containing mixed gas newly prepared is the same as the total pressure of the fluorine-containing mixed gas previously prepared.

12. The method for supplying fluorine gas as claimed in claim 6, wherein the total pressure of the fluorine-containing mixed gas newly prepared is the same as the total pressure of the fluorine-containing mixed gas previously prepared.

13. The method for supplying fluorine gas as claimed in anyone of claims 9 to 12, wherein the method comprises supplying said fluorine-containing mixed gas to an excimer laser chamber and the pressure of the fluorine-containing mixed gas prepared in said mixing container is higher than the operating pressure in said excimer laser chamber.

14. The method for supplying fluorine gas as claimed in claim 13, wherein the amount of fluorine-containing mixed gas prepared in said mixing container is not smaller than the total amount of the supply amount necessary for at least a single operation of gas adding step performed in the state that said excimer laser chamber is at an operating pressure and the supply amount necessary for at least one operation of gas exchange step performed after the evacuation of said excimer laser chamber.

15. The method for supplying fluorine gas as claimed in claim 13, wherein the amount of the fluorine-containing mixed gas prepared in said mixing container is not smaller than the supply amount necessary for at least two operations of gas adding step performed in the state that said excimer laser chamber is at an operating pressure.

16. The method for supplying fluorine gas as claimed in claim 13, wherein the process comprises supplying said fluorine-containing mixed gas to an excimer laser chamber and preparing the fluorine-containing mixed gas in said mixing container in an amount capable of implementing the supply after the evacuation of said excimer laser chamber when the pressure of the fluorine-containing mixed gas is not higher than the operating pressure in said excimer laser chamber.

17. The method for supplying fluorine gas as claimed in claim 13, wherein said mixing container is provided with a holding container and the process comprises introducing the fluorine-containing mixed gas prepared in said mixing container to and reserved in the holding container and supplied to the use point at a pressure higher than the pressure in the use point.

18. The method for supplying fluorine gas as claimed in claim 17, wherein a valve between said holding container and said mixing container is closed at the time of supplying the fluorine-containing mixed gas introduced into said holding container.

19. An apparatus for supplying fluorine gas, comprising
a fluorine gas-generating means for generating fluorine gas by controlling a fluorine-occluding substance to a predetermined temperature, and
a gas mixing container for preparing a fluorine-containing mixed gas having a predetermined pressure and a predetermined fluorine gas concentration by introducing and mixing the fluorine gas generated in said fluorine gas-generating means and a diluting gas and holding the resulting fluorine-containing mixed gas,
wherein said fluorine gas-generating means comprises
a fluorine gas-generating container for holding said fluorine-occluding substance,
a heating means for heating said fluorine gas-generating container,
a temperature controlling means for controlling the heating temperature, and
fins provided in said fluorine gas-generating container.

20. The apparatus for supplying fluorine gas as claimed in claim 19, wherein said fluorine gas-generating means comprises
a fluorine gas-generating container for holding said fluorine-occluding substance,
a heating means for heating said fluorine gas-generating container, and
a temperature controlling means for controlling the heating temperature, and
said temperature controlling means further comprises a cooling means for cooling the periphery of a valve provided on said fluorine gas-generating container.

21. The apparatus for supplying fluorine gas as claimed in claim 19, wherein said gas mixing container comprises
a gas mixing accelerating means for accelerating the mixing of said fluorine gas introduced into said mixing container with a diluting gas.

22. The apparatus for supplying fluorine gas as claimed in claim 19 or 21, wherein said gas mixing container is provided with a holding container for holding said fluorine-containing mixed gas prepared in and introduced from said gas mixing container.

23. The apparatus for supplying fluorine gas as claimed in claim 19 or 21, wherein a plurality of said gas mixing containers are disposed such that said fluorine gas and said diluting gas can be selectively introduced into the plurality of the mixing containers, and said fluorine-containing mixed gas can be selectively supplied from the plurality of gas mixing containers.

24. The apparatus for supplying fluorine gas as claimed in claim 22, wherein a plurality of said gas mixing containers are disposed such that said fluorine gas and said diluting gas can be selectively introduced into the plurality of gas mixing containers, and said fluorine-containing mixed gas can be selectively supplied from the plurality of gas mixing containers.

25. The apparatus for supplying fluorine gas as claimed in any one of claim 19, 21 or 24, wherein a plurality of said fluorine gas-generating means are provided such that fluorine gas can be selectively introduced from the plurality of fluorine gas-generating means into said mixing container.

26. The apparatus for supplying fluorine gas as claimed in claim 22, wherein a plurality of said fluorine gas-generating means are provided such that fluorine gas can be selectively introduced from the plurality of fluorine gas-generating means into said mixing container.

27. The apparatus for supplying gas as claimed in claim 23, wherein a plurality of said fluorine gas-generating means are provided such that fluorine gas can be selectively introduced from the plurality of fluorine gas-generating means into said mixing container.

28. The method for supplying fluorine gas as claimed in claim 1, wherein said fluorine gas-generating means comprises
a fluorine gas-generating container for holding said fluorine-occluding substance,
a heating means for heating said fluorine gas-generating container,
a temperature controlling means for controlling the heating temperature, and
fins provided in said fluorine gas-generating container.

29. The method for supplying fluorine gas as claimed in claim 1, wherein said gas mixing container comprises
a gas mixing accelerating means for accelerating the mixing of said fluorine gas introduced into said mixing container with a diluting gas.

* * * * *